Jan. 2, 1968          P. G. VINDEZ          3,361,013
                    SIDE CUTTING TOOL
Filed Jan. 7, 1966                        2 Sheets-Sheet 2
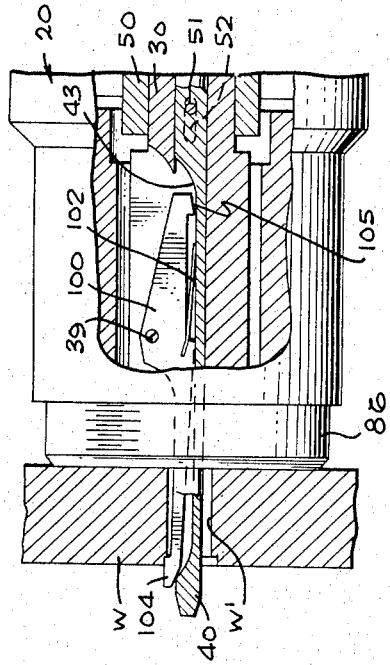
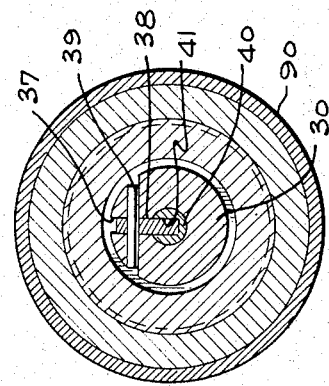
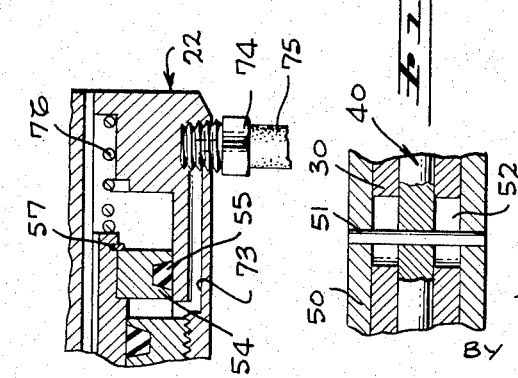
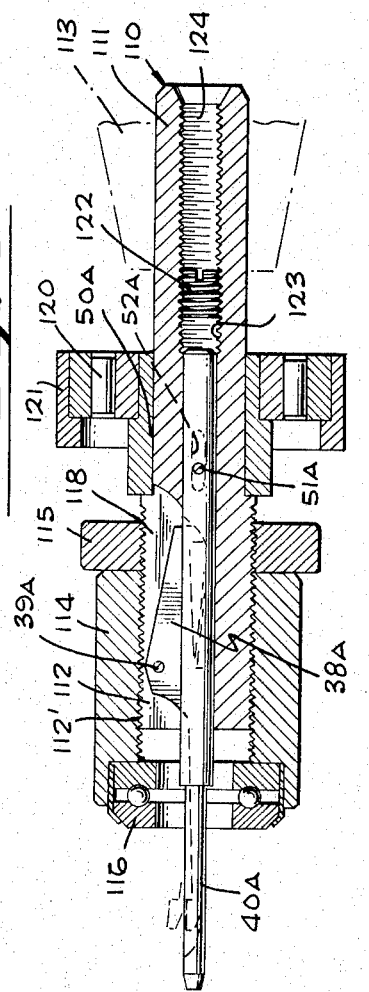
INVENTOR
PIERRE G. VINDEZ
BY
Mason & Graham
ATTORNEY

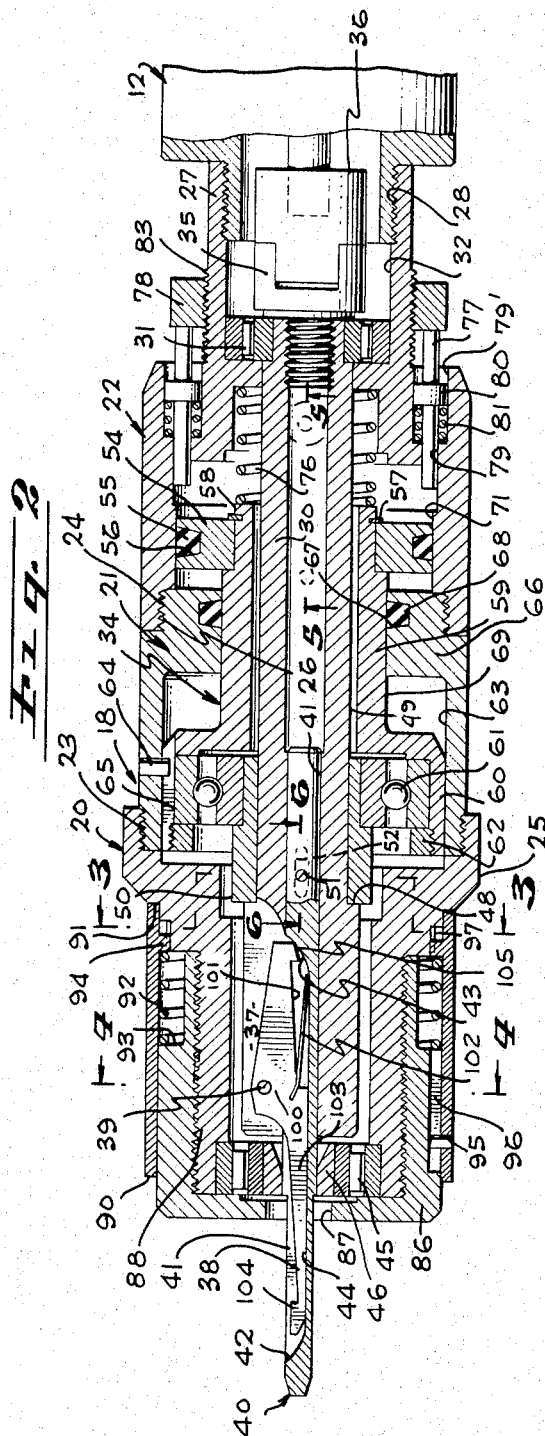
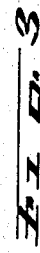
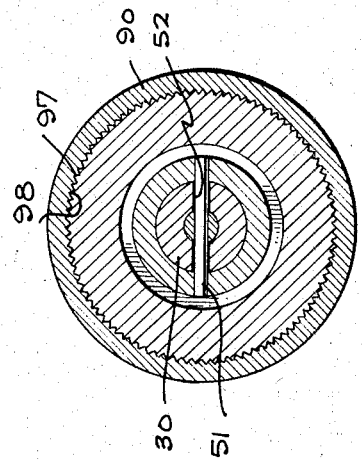
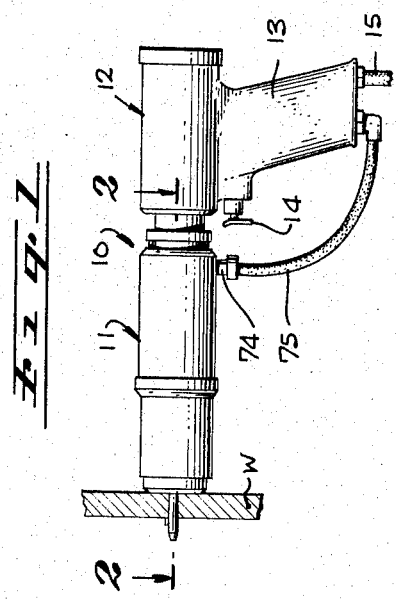
INVENTOR.
PIERRE G. VINDEZ

United States Patent Office 3,361,013
Patented Jan. 2, 1968

3,361,013
SIDE CUTTING TOOL
Pierre G. Vindez, Redondo Beach, Calif., assignor to Zephyr Manufacturing Co., Inglewood, Calif., a copartnership
Filed Jan. 7, 1966, Ser. No. 519,373
13 Claims. (Cl. 77—2)

This invention has to do with deburring, chamfering and countersinking tools and particularly with such tools as are designed to perform these operations on the rear or far side of the work.

I am aware that many tools have been devised for deburring, chamfering and countersinking on the far side of a workpiece which embody a motor-driven pilot or pilot shaft that is inserted through a hole in the work (or in some cases acts as a drill to make the hole) and a cutter blade with a cutter portion that can be expanded or moved thereafter to extend beyond the periphery of the pilot to perform a side cutting machining operation on the rear face of the work or within the hole. However, those tools with which I am familiar have several disadvantages. In many tools the blade lacks positive support when extended, resulting in vibration during operation which causes a rough surface finish on the work and often results in blade breakage.

In several tools retraction of the blade is dependent upon a special spring, failure of which can cause permanent damage to both the work and the tool. In other tools an over-travel spring is required to control the drive spindle following completion of the cutting operation.

Another serious disadvantage of many tools is the fact that the pilot is slotted completely through from side to side to accommodate the cutting blade, thereby weakening the pilot so that it readily breaks, particularly in the smaller sizes.

An object of the present invention is to provide a novel and improved tool of the type indicated which is designed and constructed to obviate or overcome and be free of the weaknesses and disadvantages of present tools pointed out above.

Another object is to provide a semi-automatic tool which is constructed to provide positive support for the cutter blade to accomplish vibration-free operation and long blade life.

A further object is to provide a device wherein the retraction of the blade into the pilot is positive, being controlled by a cam surface in the pilot thereby obviating the possibility of damage to the workpiece.

Still another object is to provide a tool of the type indicated in which the drive shank, once the tool has been seated against the work, does not advance and in which the cutting depth is accurately established and readily adjusted.

A further object is to provide a tool in which the actuation and feeding of the blade is fluid-operated.

These and other objects will be apparent from the drawings and the following description. Referring to the drawings:

FIG. 1 is a side elevational view of a tool embodying the invention shown in position against a workpiece, the latter being in section;

FIG. 2 is a longitudinal sectional view through the portion of the tool embodying the invention exclusive of the motor section on line 2—2 of FIG. 1, but on a larger scale;

FIG. 3 is a cross sectional view on line 3—3 of FIG. 2;
FIG. 4 is a cross sectional view on line 4—4 of FIG. 2;
FIG. 5 is a fragmentary sectional view on line 5—5 of FIG. 2;
FIG. 6 is a fragmentary sectional view on line 6—6 of FIG. 2;

FIG. 7 is a sectional elevational view of the forward portion of the tool in operating position; and FIG. 8 is a longitudinal sectional view of an alternate, simplified form of the invention.

More particularly describing the invention, referring first to FIGS. 1-7, in FIG. 1 I show a complete motorized tool unit 10 and this comprises a tool designated 11 which is detachably secured to a motor unit 12 having a pistol grip-type handle 13 with an operating valve control member 14. It is contemplated that the motor unit contain an air-driven motor, although this is not essential, since an electric motor may be used, and the motor unit shown is provided with an air supply hose 15, which may lead from a suitable source of compressed air (not shown).

The tool 11 comprises a tubular casing 18 which, in general, includes a forward section 20, an intermediate section 21 and a rear section 22. These sections are joined by interfitting screw threads in the regions 23 and 24, the intermediate section fitting within a belled rear end portion 25 of the forward section and within a counterbored forward end 26 of the rear section. The latter is formed with a cylindrical end section 27 of reduced diameter and this is internally threaded at 28 to receive the motor unit. A hollow spindle 30 is journaled in the rear section by a bearing 31 in bore 32. This spindle is also journaled in a hollow piston assembly 34, as will later appear. The spindle has a coupling element 35 to receive a coupling element 36 of the shaft of the motor unit.

At its forward end the spindle has a slot 37 extending radially and axially thereof to accommodate a cutter blade 38. The latter is pivotally mounted therein on a pin 39 which is mounted in the spindle.

A pilot or pilot shaft 40 is mounted in the bore 41 of the spindle and this extends beyond the spindle to project beyond other portions of the tool. The pilot is provided with an axially and radially extending slot-like recess 41 to receive the cutter blade, the pilot being formed to provide the two concave end surfaces 42 and 43 which curve outwardly from the bottom wall 44 of the recess to the outer surface of the pilot. As will later appear, the surfaces 42 and 43 serve as cams for extending and retracting the cutter blade. A bearing 45 and bushing 46 at the forward end of casing section 20 serve to journal the pilot.

The spindle is formed with a rearwardly facing shoulder 48 and a slide or slide collar 50 is mounted on the surface portion 51 of the spindle rearwardly of this shoulder for movement axially of the spindle. The slide is connected to the pilot by a pin 51 mounted in the slide and extending through the pilot so that the two elements move as a unit, the spindle being slotted at 52 to accommodate the pin and permit limited relative axial movement of the connected parts.

The slide is mounted in and for movement with the piston assembly 34. The latter includes an annular piston 54 having a seal ring 55 in a peripheral groove 56. The piston is mounted on a radially reduced end portion 58 of a hollow piston rod 59 that freely receives the spindle. A split ring 57 secures member 54. The piston rod has a radially enlarged forward end 60 to mount a bearing 61 which serves to journal the slide 50 and indirectly the spindle 30. A threaded ring 62 retains the bearing. The enlarged end 60 of the piston rod is received in the cylindrical interior wall 63 of the intermediate section of the casing. A pin 64 in the housing is received in a slot 65 of the piston rod to prevent relative rotation of the parts.

The intermediate section 21 of the housing is provided with a relatively thick internal flange 66 that is internally grooved at 67 to receive a seal ring 68. The latter receives the peripheral surface 69 of the piston rod 59. The rear section 22 of the housing has a cylindrical inner face 71, and in conjunction with the intermediate section 21, forms a cylinder for the operation of the piston 54. Access of fluid to the interior of the cylinder at its forward end is provided by a fluid passage 73 and a suitable fitting 74. Pressure fluid, such as compressed air, is supplied by a hose 75 that is controlled by a suitable valve such as one operated by valve control member 14. A spring 76 behind the piston 34 assembly serves to act as a return means therefor.

In order to adjustably control the movement of the cutter from retracted to desired extended position, I provide means for limiting the stroke of the piston. This comprises two or more axially extending piston abutment pins 77 and an adjustable ring 78. Each pin is mounted in a bore 79 and counterbore 79′, the pin having a flange or radially enlarged midsection 80 intermediate its ends received in the counterbore against which a coil compression spring 81 bears to urge the pin outwardly. The adjustment ring 78, which is internally threaded, is carried on a threaded portion 83 of the rear casing section 22. Any suitable indicia may be provided on the casing to aid a person in making the adjustment. It will be apparent that by rotating the ring the position of the pins and hence the stroke of the piston can be adjusted.

The forward section 20 of the casing is provided with an internally threaded nose cap 86 which is centrally apertured at 87 to pass the pilot and cutter blade. The cap is positioned on a threaded section 88 of reduced diameter so that the cap can be adjusted axially with respect thereto. The nose cap carries a sleeve 90 which is urged rearwardly against a shoulder 91 by a compression coil spring 92 received in a recessed portion 93 of the nose cap and operating against an internal flange 94 on the sleeve. The parts are connected against relative rotation by means of a pin 95 and slot 96. The sleeve 90 thus serves as a convenient means for rotating and thereby axially adjusting the nose on the forward section of the casing and also serves as an indicator of the position of the nose relative to the casing, the serrations 97, 98 serving as a positive indexing means. Suitable indicia (not shown) may be provided on the periphery of the nose to be read in conjunction with the forward edge of the sleeve.

As previously indicated, the cutter blade 38, which is flat-sided, is pivotally mounted in a slot 37 in the spindle and is received in a recess 41 in the pilot. The blade includes a wide main body section 100, recessed at 101 to accommodate a flat spring 102 that urges the blade to its retracted position as shown in the drawings. A shank 103 extends from section 100 and terminates in a cutting head 104. In its retracted position a cam follower surface 105 on the inner end of the blade is positioned on cam surface 43 and positively maintains the blade in its retracted position. If the pilot is retracted by slide 50 and the piston assembly, the cutter head rides on cam surface 42 to extend the blade to machining position where the blade is supported or backed up by the cam.

In the operation of the device, ring 78 is adjusted to regulate the stroke of the piston and in consequence the maximum possible lateral projection of the cutter blade. Depending upon the thickness of the work, the sleeve 90 is turned to adjust the nose cap on the casing. The pilot is then inserted and advanced through the hole W′ in the workpiece W (FIG. 7) to seat the nose cap against the work. Fuid under pressure is then applied to the piston to retract the pilot and thereby extend the cutter into engagement with and feed the same into the work as the spindle is rotated by the motor unit. When the machining operation is completed, the pressure fluid is allowed to escape from behind the piston 54 and spring 76 moves the piston assembly 34 and connected parts forward to retract the cutter blade. The pilot can then be withdrawn from the work.

In FIG. 8 I show a simplified, manually operable device. This comprises a hollow spindle 110 with an end portion 111 adapted to be received in a chuck 113 of an air or electric motor (not shown). The forward portion 112 of the spindle is enlarged radially and externally threaded at 112′ to accommodate a sleeve 114 and a locknut 115. The sleeve carries a thrust bearing 116 at its outer end. The spindle is slotted at 118 to receive a cutter blade 38A, the same as blade 38 previously described, mounted on a pin 39A. I also provide a pilot, designated 40A, similar to the one previously described, and this is connected by pin 51A to a collar or slide 50A the pin being received in slots 52A in the spindle.

In this form of the invention, the slide 50A carries a bearing 120 in a retainer 121, thereby providing a member which does not rotate and may be grasped by hand to extend and feed and to retract the cutter blade, the mechanical action of the parts being the same as in the device previously described. A setscrew 122 of the type having a friction plastic insert is provided in a threaded section 123 of the bore 124 in the spindle for the purpose of limiting the movement of the pilot relative to the spindle.

In the operation of the device of FIG. 8 the setscrew 122 is adjusted to limit the movement of the pilot relative to the spindle, and hence the amount the cutter can be extended. Sleeve 114 is adjusted depending upon the thickness of the work. The pilot is then inserted in the work until the thrust bearing 116 bears against the work. The cutter is then extended by manually retracting member 121. When the operation is completed, member 121 is moved forward to retract the cutter blade to permit withdrawal of the pilot.

Although I have illustrated and described a preferred form of my invention, I contemplate that various changes and modifications can be made therein without departing from the invention, the scope of which is indicated by the following claims.

I claim:

1. A chamfering, deburring and countersinking tool, comprising a tubular casing, a hollow spindle journaled in said casing and having an axial slot, a cutter blade pivotally mounted in the slot of said spindle and extending axially beyond the spindle and the end of the casing, a pilot received in said spindle and movable axially therein, said pilot being slotted and receiving said cutter blade, a slide member on said spindle and movable axially with respect thereto, means connecting said slide member and said pilot for axial movement as a unit relative to said spindle, and means on said pilot for pivoting said cutter blade in response to relative movement between said pilot and spindle.

2. The tool set forth in claim 1 in which prime mover means is provided in the casing for actuating said slide member.

3. The tool set forth in claim 1 in which said casing provides a cylinder and in which a piston is provided therein for moving said slide member.

4. The tool set forth in claim 1 in which a cylindrical chamber is provided in said casing, in which a piston is provided in said chamber, and in which a hollow piston rod extends from the piston, surrounds said spindle and journals said slide member.

5. The tool set forth in claim 1 in which a piston assembly is provided within the casing for operating said slide and in which an adjustable stop means is provided for limiting the stroke of said piston.

6. The tool set forth in claim 5 in which said casing is provided with an axially adjustable work-engaging member at the working end thereof.

7. The tool set forth in claim 1 in which means is provided for limiting the stroke of said slide member.

8. The tool set forth in claim 1 in which said casing is provided with an axially adjustable work-engaging member at the working end thereof.

9. The tool set forth in claim 1 in which spring means is provided for moving said slide in one direction and fluid-operated means is provided for moving said slide in the other direction.

10. The tool set forth in claim 1 in which the cutter blade-receiving slot of the pilot is formed to provide an inclined cam face at its outer end engageable by the outer end of the cutter blade to cam the cutter blade to extended position and thereafter support the same in said position.

11. The tool set forth in claim 9 in which the cutter blade-receiving slot of the pilot is formed to provide an inclined cam face at its inner end engageable by the inner end of said cutter blade to cam the blade to retracted position.

12. A chamfering, deburring and countersinking tool, comprising a hollow spindle adapted to be rotated by a motor unit, said spindle having a radially enlarged, externally threaded forward end portion, an internally threaded sleeve on said forward end portion, a thrust bearing carried at the forward end of said sleeve and having a portion adapted to bear against the work, said spindle having an axial slot in its forward end portion, a cutter blade pivotally mounted in the slot of said spindle and extending axially beyond the spindle and the end of the casing, a pilot received in said spindle and movable axially therein, said pilot being slotted and receiving said cutter blade, a slide member on said spindle and movable axially with respect thereto, means connecting said slide member and said pilot for axial movement as a unit relative to said spindle, and means on said pilot for pivoting said cutter blade in response to relative movement between said pilot and spindle.

13. The tool set forth in claim 12 in which an operating ring is mounted on said slide with a bearing between the ring and slide.

References Cited
UNITED STATES PATENTS

| | | | |
|---|---|---|---|
| 2,373,474 | 4/1945 | Heyer | 77—73 |
| 2,669,887 | 2/1954 | Rees | 77—2 |
| 3,017,791 | 1/1962 | Fried | 77—73.5 |
| 3,019,712 | 2/1962 | Winberry | 77—73.5 |
| 3,037,406 | 6/1962 | Fried | 77—73.5 |

GERALD A. DOST, *Primary Examiner.*